United States Patent [19]

Mansukhani

[11] 4,242,369
[45] Dec. 30, 1980

[54] PLATING OF SUBSTRATES BY JET PRINTING

[75] Inventor: Ishwar R. Mansukhani, Neenah, Wis.

[73] Assignee: Whittaker Corporation, Los Angeles, Calif.

[21] Appl. No.: 804,469

[22] Filed: Jun. 7, 1977

[51] Int. Cl.$^2$ ............................................... B05D 3/14
[52] U.S. Cl. ......................................... 427/47; 427/287; 427/405
[58] Field of Search .................. 106/1, 20, 22, 23; 427/47, 287, 405

[56] References Cited

U.S. PATENT DOCUMENTS

| | | | |
|---|---|---|---|
| 2,069,828 | 2/1937 | Hauptli | 106/20 |
| 2,873,214 | 2/1959 | Schnable | 106/1 |
| 3,465,350 | 9/1969 | Keur et al. | 346/75 |
| 3,465,351 | 9/1969 | Keur et al. | 346/75 |
| 3,475,143 | 10/1969 | O'Connor | 427/405 X |
| 3,503,762 | 3/1970 | Remer | 106/23 |
| 3,705,043 | 12/1972 | Zabiak | 106/22 |
| 3,964,914 | 6/1976 | Bullock et al. | 106/20 X |

*Primary Examiner*—Bernard D. Pianalto
*Attorney, Agent, or Firm*—Henry M. Bissell

[57] ABSTRACT

In accordance with certain of its aspects, this invention relates to novel compositions and to the process for the plating of substrates by the jet printing of a metal or alloy which comprises continuously imprinting minute uniform droplets of a jet printing ink containing at least one soluble salt of at least one plate metal which is more noble than said basis metal, said jet printing ink exhibiting a viscosity at 68° F. of between about 1.5 and 16 cps., said ink having a pH of between 0.5 and 9.5 and a specific resistivity of less than 10,000 ohm cm., onto a substrate, said droplets emitting from at least one ink jet electromagnetically energized to emit said droplets of ink at a rate of 8 to 150 kilohertz.

13 Claims, No Drawings

PLATING OF SUBSTRATES BY JET PRINTING

BACKGROUND OF THE INVENTION

Ink jet printing is a recent development in the art of applying identifying and decorative indicia to a base. In general terms, a fluid ink is forced, under pressure, through a very small orifice in an orifice block which contains a piezoelectric crystal vibrating at high frequency (50-100,000 vibrations per second) causing the ink passing through the orifice to be broken into minute droplets equal in number to the crystal vibrations. The minute droplets are passed through a charging area where individual droplets receive an electrical charge in response to a video signal, the amplitude of the charge being dependent on the amplitude of the video signal. The droplets then pass through an electrical field of fixed intensity, causing a varied deflection of the individual droplets dependent on the intensity of the charge associated therewith, after which the deflected drops are allowed to infringe on the base medium which is to receive the decorative or informative printed indicia. Apparatus suitable for carrying out the ink jet printing process is described in detail in U.S. Pat. Nos. 3,465,350 and 3,465,351, issued Sept. 2, 1969, and it is in connection with an apparatus and process such as are described in the aforementioned patents that the ink of the present invention is designed to function.

In addition to the requirement of proper wetting of the metal surface to be printed, the droplets of ink must adhere strongly to the surface, after application and drying, so that the printed matter is resistant to both physical rubbing or abrasive action and also is resistant to moisture. The ability of the ink to form and retain a desired image on a metal surface in the presence of moisture and the ability to resist removal by moisture is of great importance in this application because the metal can surfaces are generally damp before, during and after the printing operation.

DESCRIPTION OF THE INVENTION

In accordance with certain of its aspects, this invention relates to novel compositions and to the process for the plating of substrates by the jet printing of a metal or alloy which comprises continuously imprinting minute uniform droplets of a jet printing ink containing at least one soluble salt of at least one plate metal which is more noble than said basis metal, said jet printing ink exhibiting a viscosity at 68° F. of between about 1.5 and 16 cps., said ink having a pH of between 0.5 and 9.5 and a specific resistivity of less than 10,000 ohm cm., onto a substrate, said droplets emitting from at least one ink jet electromagnetically energized to emit said droplets of ink at a rate of 8 to 150 kilohertz.

The basis metal which may be treated by practice of this invention may include those metals which may have a positive electrode potential (as set forth on page 1740 of the 44 edition of the Handbook of Chemistry and Physics) of less than about 2.37 volts and which may include tin plate, tin free steel, magnesium, aluminum, beryllium, uranium, manganese, titanium, tellurium, zinc, chromium, iron, cadmium, indium, thallium, cobalt, nickel, molybdenum, tin, lead, steel, etc. This invention finds particular use in the plating onto tin plate, aluminum and magnesium, either in pure form or in alloy. Other alloys on which a plate may be deposited may be tin-lead (pewter), zinc-tin, zinc-copper, copper-tin, zinc-nickel, etc.

It is a particular feature of this invention that it may be used to plate onto basis metals such as aluminum, including aluminum alloys of a wide variety. Typical of such aluminum alloys may be those containing various proportions of other metals including copper, chromium, zinc, nickel, magnesium, silicon, and manganese. A typical aluminum alloy may be that commercially identified as aluminum alloy No. 1100 which may contain 99+% aluminum.

A second typical aluminum alloy may be that commercially identified as aluminum alloy No. 5052 having the following composition:

| No. 5052 | % |
|---|---|
| aluminum | 97.25 |
| magnesium | 2.5 |
| chromium | 0.25 |

The following may be typical of other aluminum alloys:

| | % |
|---|---|
| No. 356 | |
| aluminum | 92.7 |
| silicon | 7.0 |
| magnesium | 0.3 |
| No. 2024 | |
| aluminum | 92.05 |
| magnesium | 1.5 |
| chromium | 0.1 |
| copper | 4.5 |
| iron | 0.5 |
| silicon | 0.5 |
| manganese | 0.6 |
| zinc | 0.25 |
| No. 360 | |
| aluminum | 90.00 |
| silicon | 9.5 |
| magnesium | 0.5 |

In practice of the process of this invention, the basis metal, typically tin plated steel, to be printed may preferably have been cleaned. Typically, cleaning may have included placing the basis metal, e.g. aluminum metal, in a vapor degreasing operation, typically using trichlorethylene. The metal may preferably then be further cleaned in an alkaline cleaner, typically by immersion in a 1%-5%, say 3% aqueous solution of sodium hydroxide, sodium orthophosphate, sodium carbonate, etc. or mixtures thereof.

The metal may be further cleaned by treatment with acid. Typically this may be effected by dipping into a solution preferably containing at least one acid selected from the group consisting of nitric acid and hydrofluoric acid. Preferably the solution may contain 5%-50%, say 20% by weight of the acid. The preferred solution may contain 20% $HNO_3$. When the basis metal forms insoluble salts with the more common acids, the acid solution may include acids which do not form insoluble salts e.g. fluoboric acid may be used when the metal is lead. The metal may be maintained in the acid for 10-120 seconds, say 30 seconds.

Preferably after acid dipping, the metal may be rinsed in water to remove the acid which may remain on the surface. Typically rinsing may be effected by dipping in a body of water for 5 seconds to 3 minutes, say 1 minute.

In practice of this invention, the basis metal may be printed by jet printing with an ink containing a soluble salt of a plate metal which is more noble than said basis metal. Those metals of the electromotive series which fall below the basis metal to be plated, may be considered for purpose of this invention as more noble metals. Typically, for example, illustrative basis metals and plate metals may be as set forth in Table I.

TABLE I

| Basis Metal | Plate Metal |
| --- | --- |
| Tin | Copper |
| Magnesium | Tin |
| " | Copper |
| " | Zinc |
| " | Cadmium |
| Aluminum | Tin |
| " | Copper |
| " | Zinc |
| " | Nickel |
| Zinc | Copper |
| " | Tin |
| " | Nickel |
| " | Silver |
| Lead | Tin |
| " | Copper |
| " | Silver |

Typically the plate metal may be present in the ink in the form of a soluble salt, including e.g. stannates such as sodium stannate; cyanides such as copper cyanide, cadmium cyanide, zinc cyanide, and silver cyanide; sulfates such as nickel sulfate; nitrates such as silver nitrate; etc. The ink may be an alkaline bath e.g. copper cyanide bath, or an acid bath e.g. stannous chloride.

A typical bronze ink may contain copper sulfate CuCN, potassium hydroxide KOH, and preferably additives including e.g. Rochelle salts, gluconates, versenates, etc.

It is preferred to describe bronze inks in terms of their content of (a) potassium cuprocyanide $2KCN \cdot CuCN$, (b) free potassium cyanide KCN, (c) potassium stannate $K_2Sn(OH)_6$, and (d) potassium hydroxide KOH. A typical bronze alkaline ink may contain the following:

| Component | Amount g/l | Preferred g/l |
| --- | --- | --- |
| $K_2Sn(OH)_6$ | 25–175 | 90 |
| $2KCN \cdot CuCN$ | 25–100 | 56 |
| Free KCN | 10–30 | 20 |
| KOH | 0–5 | 3 |
| Additive: Rochelle salt | 15–25 | |

A typical tin-zinc ink may contain zinc cyanide $Zn(CN)_2$, potassium cyanide KCN, potassium stannate $K_2Sn(OH)_6$, and potassium hydroxide KOH. Typically such a bath may have the following composition:

| Component | Amount g/l | Preferred g/l |
| --- | --- | --- |
| $K_2Sn(OH)_6$ | 25–175 | 90 |
| $Zn(CN)_2$ | 5–50 | 10 |
| KCN | 17.5–30 | 22.5 |
| KOH | 40–60 | 52.5 |

The Electrolyte Component

In order that the droplets of ink ejected from the nozzles may receive and hold the proper electrical charge, the ink must have a specific resistivity within a range from somewhat below 100 ohm cm. to about 10,000 ohm cm., the preferred operative range being between about 150 and 3,000 ohm cm. It has been found that some of the ink compositions of this invention will naturally have a specific resistivity within the operable range without the necessity of adding an electrolytic component specifically for the purpose of adjusting the resistivity of the ink. In general, however, it has been found that optimum results are obtained if there is added to the ink an optional component which comprises a salt or mixture of salts which is soluble in the ink medium and which has no deleterious effects on the printing apparatus or on the printed substrate. Particularly satisfactory for this use is paratoluene sulfonic acid although alkali metal chlorides, nitrates, sulfates and similarly soluble salts may also be used. Dimethylamine hydrochloride, which has a high solubility in the solvent media hereinbefore described, is of particular utility because of this property.

The electrolyte component may be added in an amount which will be effective in lowering the specific resistivity of a given ink to the desired level. The effective amount of electrolyte will vary from zero to 2 or 3% or higher, depending on the original resistivity of the ink and on the resistivity desired. Amounts of the preferred electrolytes in excess of about 1.5% are generally considered unnecessary and are therefore economically undesirable. Higher salt concentrations result in ink compositions of progressively lower resistivity. Although inks of very low specific resistivity are quite operable in the process of jet printing, resistivity values of less than about 100 ohm cms. present no particular advantage over those inks having a resistivity between about 100 and 300 ohm cms., the latter range of values being considered optimum. The alkali metal salts previously mentioned may also be used in concentrations up to about 2.0%, higher concentrations being both unnecessary and difficult to maintain because of the limited solubility of these materials in the solvent media used in the ink compositions of this invention. Because of their greater solubility in the alcohol-water solvent system, the preferred salts are dimethylamine hydrochloride and lithium chloride, used either alone or in combination, in a total salt concentration of about 1.5% by weight of the ink composition.

Practice of this invention may be observed from the following examples:

EXAMPLE 1

Tin plate was printed with a jet printing ink composed of 2.5 parts of copper sulfate, 100.0 parts of water and 2.5 parts of paratoluene sulfonic acid. The resulting plate exhibited good adhesion and other properties.

EXAMPLE 2

Tin plate was printed with a jet printing ink composed of 5.0 parts of copper sulfate, 55.0 parts of water and 10.0 parts of paratoluene sulfonic acid. The resulting plate exhibited good adhesion and other properties.

EXAMPLE 3

Tin plate was printed with a jet printing ink composed of 5.0 parts of silver nitrate, 40 parts of water, 1.0 part of nitric acid and 54.0 parts of methanol. The resulting plate exhibited good adhesion and other properties.

What is claimed is:

1. A process for the plating of substrates by the jet printing of a metal or alloy which comprises continuously imprinting minute uniform droplets of a jet printing ink containing at least one soluble salt of at least one plate metal which is more nobel than said basis metal, said jet printing ink exhibiting a viscosity at 68° F. of between about 1.5 and 16 cps., said ink having a pH of between 0.5 and 9.5 and a specific resistivity of less than 10,000 ohm cm., onto a substrate, said droplets emitting from at least one ink jet electromagnetically energized to emit said droplets of ink at a rate of 8 to 150 kilohertz.

2. The process for plating a plate metal onto the surface of a basis metal as claimed in claim 1 wherein said basis metal contains tin.

3. The process for plating a plate metal onto the surface of a basis metal as claimed in claim 2 wherein said plate metal is selected from the group consisting of tin, copper, zinc and nickel.

4. The process for plating a plate metal onto the surface of a basis metal as claimed in claim 1 wherein said basis metal contains steel.

5. The process for plating a plate metal onto the surface of a basis metal as claimed in claim 4 wherein said plate metal is selected from the group consisting of tin, copper, zinc, cadmium and silver.

6. The process for plating a plate metal onto the surface of a basis metal as claimed in claim 1 wherein said plate metal is copper.

7. The process for plating a plate metal onto the surface of a basis metal as claimed in claim 1 wherein said plate metal is silver.

8. The process for plating a plate metal onto the surface of a basis metal as claimed in claim 1 wherein said plate metal is selected from the group consisting of copper, zinc, nickel and silver.

9. The process for plating onto the surface of a basis metal which comprises printing said basis metal first with a jet printing ink containing a soluble metal salt of a metal more noble than said basis metal, said basis metal having an activated surface; subsequently jet printing said basis metal having said activated surface thereon with a jet printing ink containing:
 (1) metal ions in substantially the same concentration as in said first jet printing ink and in addition thereto,
 (2) ions of an auxiliary plate metal not present in said first jet printing ink.

10. The process of claim 9 wherein the surface is a tin plated basis metal.

11. The process of claim 9 wherein the surface is a tin plated basis metal and copper is present in both the first and second jet printing inks.

12. The process for plating onto the surface of an aluminum basis metal as claimed in claim 9 wherein said auxiliary plate metal is copper.

13. The process for plating onto the surface of an aluminum basis metal which comprises jet printing said aluminum basis metal with an activating jet printing ink containing a soluble salt of a metal more noble than aluminum and being essentially free of active copper ions; subsequently jet printing said aluminum having said activating surface thereon with a second jet printing ink containing:
 (1) a soluble stannate in substantially the same concentration as in said activating jet printing ink and in addition thereto,
 (2) ions of copper;
to obtain a plate containing tin and copper.

* * * * *